United States Patent
Wewel et al.

(10) Patent No.: US 7,340,617 B1
(45) Date of Patent: Mar. 4, 2008

(54) SYSTEM AND METHOD OF DYNAMICALLY CONTROLLING STORAGE DEVICE POWER SUPPLY CURRENT

(75) Inventors: Paul A. Wewel, Broomfield, CO (US); Lance J. Collins, Superior, CO (US); Ronald Rae Walker, Louisville, CO (US)

(73) Assignee: Storage Technology Corporation, Louisville, CO (US)

( * ) Notice: Subject to any disclaimer, the term of this patent is extended or adjusted under 35 U.S.C. 154(b) by 437 days.

(21) Appl. No.: 10/858,239

(22) Filed: Jun. 1, 2004

(51) Int. Cl.
*G06F 1/00* (2006.01)

(52) U.S. Cl. ...................................... 713/300; 713/323
(58) Field of Classification Search ................ 713/300, 713/323
See application file for complete search history.

(56) References Cited

U.S. PATENT DOCUMENTS

| | | |
|---|---|---|
| 3,629,710 A | 12/1971 | Durland |
| 4,242,619 A | 12/1980 | Nakamura et al. |
| 4,287,458 A | 9/1981 | Nakamura et al. |
| 4,775,902 A | 10/1988 | Trovato et al. |
| 5,506,878 A | 4/1996 | Chiang |
| 5,557,551 A * | 9/1996 | Craft ........................... 702/130 |
| 5,566,077 A | 10/1996 | Kulakowski et al. |
| 5,589,996 A | 12/1996 | Patrick et al. |
| 5,940,606 A | 8/1999 | Ghia et al. |
| 5,986,426 A | 11/1999 | Rowan |
| 6,157,671 A | 12/2000 | Young |
| 6,353,877 B1 | 3/2002 | Duncan et al. |
| 6,577,465 B1 | 6/2003 | Bennett et al. |
| 6,904,534 B2 * | 6/2005 | Koenen ....................... 713/323 |
| 2003/0046396 A1 * | 3/2003 | Richter et al. .............. 709/226 |
| 2005/0160189 A1 * | 7/2005 | McNeill et al. ................ 710/1 |

* cited by examiner

*Primary Examiner*—Rehana Perveen
*Assistant Examiner*—Tse Chen
(74) *Attorney, Agent, or Firm*—Brooks Kushman P.C.

(57) ABSTRACT

For use in a data storage system, a method of dynamically controlling accesses to and from the storage device array. The method includes monitoring the type and frequency of IO requests to the devices to determine the duty cycle and monitoring at least one parameter related to power usage, receiving or having at least one IO request pending when the data storage system completes the IO and returns to the Idle state, determining when the power usage by the array is greater than the first predetermined level, returning to the idle state when the power usage of the array is greater than the first predetermined level, determining when the duty cycle or the power usage by the array is greater than the second predetermined level when the power usage by the array is equal to or less than the first predetermined level, presenting and alert signal, setting a delay factor when the delay is not set, and determining whether an inter-IO delay has expired when the duty cycle or power usage by the array is greater than the second predetermined level, returning to the idle state when the inter-IO delay has not expired, and performing a respective IO operation in response to the Io request and returning to the idle state when the inter-IO delay has expired, and when the duty cycle or the power usage by the array is equal to or less than the second predetermined level.

18 Claims, 3 Drawing Sheets

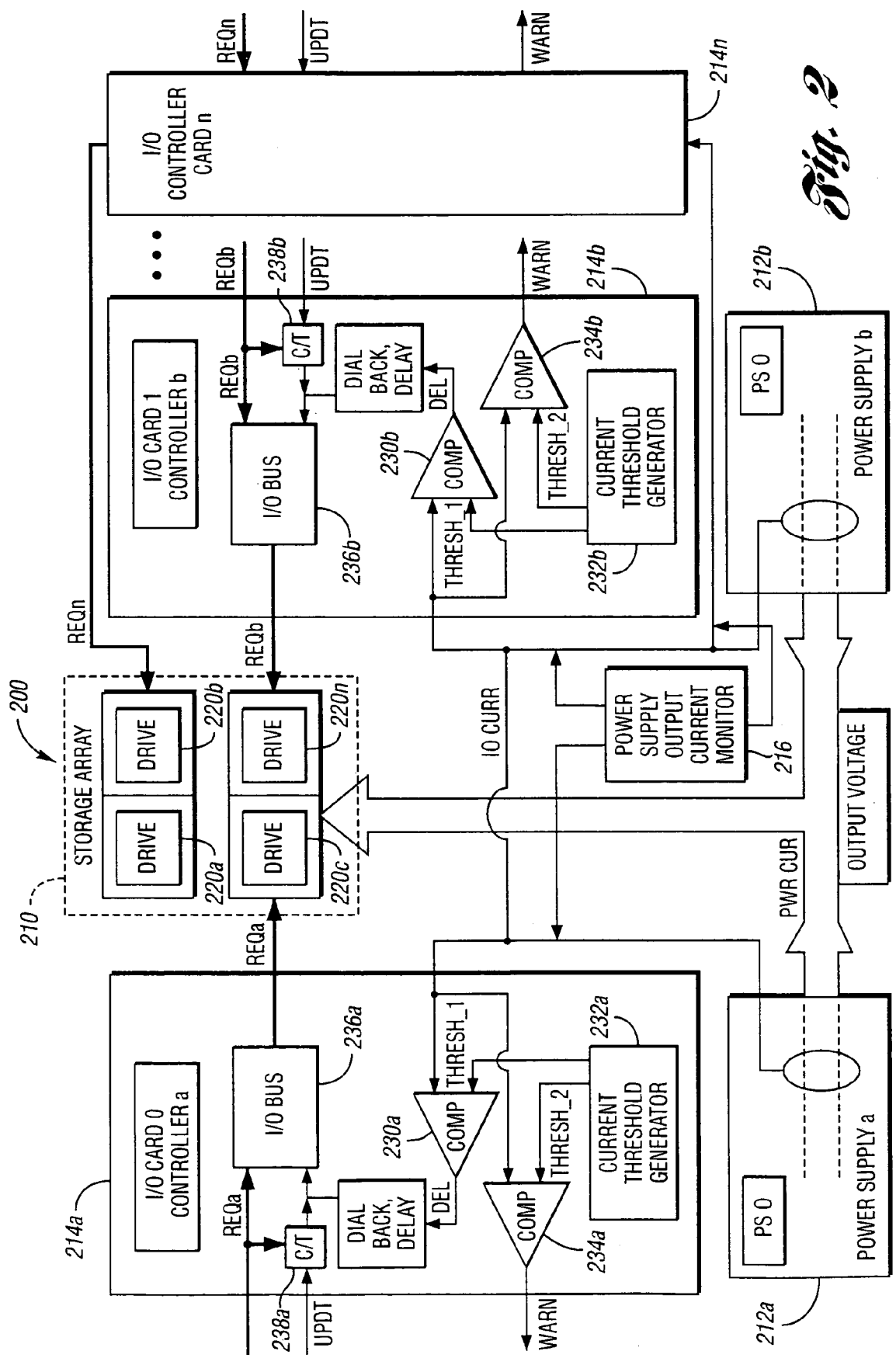

SYSTEM AND METHOD OF DYNAMICALLY CONTROLLING STORAGE DEVICE POWER SUPPLY CURRENT

BACKGROUND OF THE INVENTION

1. Field of the Invention

The present invention relates to a system and a method for dynamically controlling storage device power supply current.

2. Background Art

Data storage devices (e.g., disk drives, tape drives, and the like) have advertised reliability numbers (e.g., mean time between failures, MTBF) that are based on several external factors. MTBF for a storage device is generally calculated at a given duty cycle, i.e., the percentage of time the storage device is performing an access (e.g., reading, writing, verifying data, etc.).

Reliability is an important factor in customer satisfaction with data storage devices. One of the major factors in the determination of storage device reliability is the duty cycle of the storage device. The duty cycle can be a particularly important factor in the MTBF of inexpensive storage devices such as Advanced Technology Attachment (ATA) disk drives. The reliability MTBF projections are substantially reduced when duty cycles are above the levels that are specified by the storage device manufacturer. MTBF can vary non-linearly with increased duty cycle. In many data storage subsystem implementations, the subsystem has minimal control at best over input/output (IO) patterns that are received from host devices. Thus, actual MTBFs for conventional storage device approaches can be substantially less than manufacturer reliability projections (i.e., the storage devices can be less reliable than projected) and customer satisfaction can be negatively affected.

Further, in redundant powered data storage systems (systems that generally are implemented with two separate power supplies, so-called 2N supply systems), each power supply is generally configured having capacity sufficient to support the entire data storage system load. For example, when one of the power supplies breaks down or is taken off line for upgrades, repair and the like, the remaining power supply is sized such that the data storage system can remain substantially fully functional.

In a typical data storage system, each power supply is generally configured to support maximum electrical current loads at a number of substantially constant voltage levels (e.g., 5 V and 12 V). However, some data storage system components (e.g., drives) in a multiple data storage device system have a high current load at a first voltage level (e.g., a 5 V level), and other data storage system components have a high current load at another voltage level (e.g., a 12 V level). As such, each power supply is configured to support the maximum electrical current load at all of the voltage levels. Because data storage systems are not typically implemented with data storage devices that all present all of the maximum current loads, the conventional system are implemented with excess current and power capacity and the related cost, weight and size deficiencies.

Yet further, the data storage system power supply is to be specified to ensure adequate power to meet customer power demands (i.e., loads). Using conventional approaches, the sum of the worst case power consumption for all of the system components is used to ensure that each power supply can support the worst case load. The worst case load includes worst case activity on the storage device drives, whether the worst cast is 100% sequential read operations, 100% random read/write operations, or any other worst case operation including a worst case per power supply output.

Under typical operating conditions, the worst case load is rarely encountered. Storage system drive operation is typically more idle than active. Conventional approaches to storage systems generally yield over-rated power supplies and corresponding increased cost, size and weight. In one circumstance, a power supply system that is rated for worst case operation is justified, that is, when the data storage system is known to encounter all worst case power draws and worst case drive activity. However, for many other data storage systems, conventional approaches yield over-rated power supplies.

Thus there exists an opportunity and need for an improved system and method for a storage device that provides dynamic control of the duty cycle of accesses to and from the storage device.

SUMMARY OF THE INVENTION

The present invention generally provides a system and a method for new, improved and innovative techniques to dynamically control the duty cycle of accesses to and from data storage devices. Such a system and a method may include new, improved and innovative techniques for dynamically controlling storage device power supply current. Such a system and method generally provides improved data storage system reliability, and lower cost and weight, and smaller size, especially of the data storage system power supply subsystem, than conventional approaches.

According to the present invention, for use in a data storage system, a method of dynamically controlling accesses to and from a storage device array is provided. The method comprises monitoring at least one parameter related to power usage of the data storage system, receiving an IO request when the data storage system is at an idle state, determining when power usage by the array is greater than a first predetermined level, returning to the idle state when the power usage by the array is greater than the first predetermined level, determining when the power usage by the array is greater than a second predetermined level when the power usage by the array is equal to or less than the first predetermined level, setting a delay factor when the delay is not set, and determining whether an inter-IO delay has expired when the power usage by the array is greater than the second predetermined level, returning to the idle state when the inter-IO delay has not expired, and performing a respective IO operation in response to the IO request and returning to the idle state when the inter-IO delay has expired, and when the power usage by the array is equal to or less than the second predetermined level.

Also according to the present invention, a data storage system having a dynamically controlled storage device power supply current is provided. The system comprises a storage device array and a controller. The storage device array includes at least one data storage device. The controller includes an input/output (IO) bus and at least one IO controller. The IO bus is generally configured to present at least one IO request that relates to a respective access to and from the at least one storage device. The at least one IO controller is generally configured to monitor at least one parameter related to power usage of the data storage system, receive IO requests when the data storage system is at an idle state, determine when power usage by the array is greater than a first predetermined level. The IO controller may be further configured to return to the idle state when the power usage by the array is greater than the first predetermined level, determine when the power usage by the array is greater than a second predetermined level when the power usage by the array is equal to or less than the first predetermined level, set a delay factor when the delay is not set, and determine whether an inter-IO delay has expired when the power usage by the array is greater than the second predetermined level, return to the idle state when the inter-IO delay has not expired, and perform a respective IO operation in response to the IO request and return to the idle state when the inter-IO delay has expired, and when the power usage by the array is equal to or less than the second predetermined level.

Further, according to the present invention, a controller for dynamically controlling accesses to and from at least one storage device in a data storage system array is provided. The controller comprises an input/output (IO) bus configured to present at least one IO request that relates to a respective access to and from the at least one storage device, and at least one IO controller. The IO controller is generally configured to monitor at least one parameter related to power usage of the data storage system, receive IO requests when the data storage system is at an idle state, determine when power usage by the array is greater than a first predetermined level, return to the idle state when the power usage by the array is greater than the first predetermined level, determine when the power usage by the array is greater than a second predetermined level when the power usage by the array is equal to or less than the first predetermined level, present an alert signal, set a delay factor when the delay is not set, and determine whether an inter-IO delay has expired when the power usage by the array is greater than the second predetermined level, return to the idle state when the inter-IO delay has not expired, and perform a respective IO operation in response to the IO request and return to the idle state when the inter-IO delay has expired, and when the power usage by the array is equal to or less than the second predetermined level.

The above features, and other features and advantages of the present invention are readily apparent from the following detailed descriptions thereof when taken in connection with the accompanying drawings.

BRIEF DESCRIPTION OF THE DRAWINGS

FIG. 2 is a diagram of a power system of the present invention.

DETAILED DESCRIPTION OF THE PREFERRED EMBODIMENT(S)

Figure 1A:
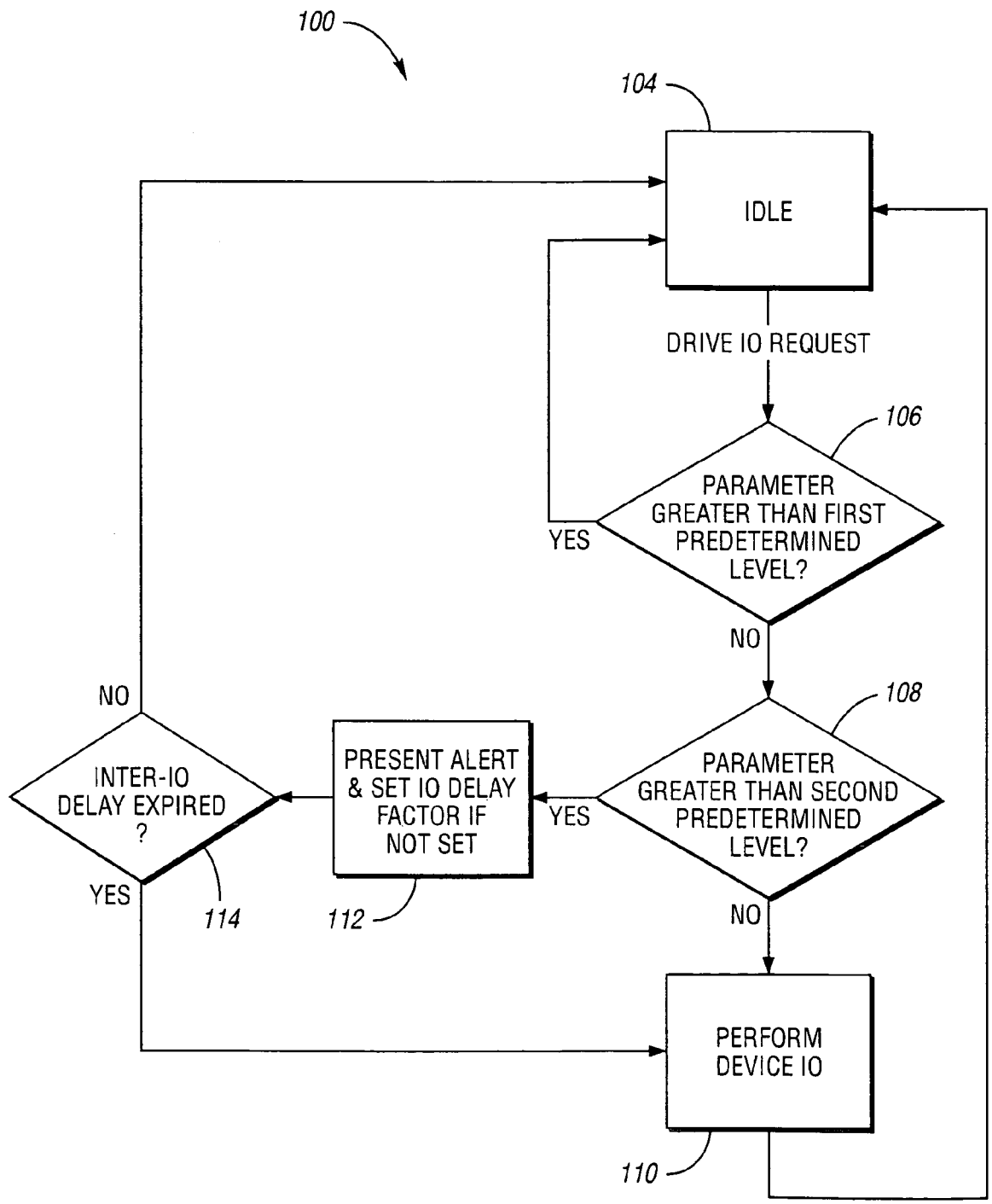
FIGS. 1(*a-b*) are flow diagrams of methods of dynamically controlling the duty cycle of accesses to and from data storage devices according to the present invention.

With reference to the Figures, the preferred embodiments of the present invention will now be described in detail. Generally, the present invention provides an improved system and method for new and innovative techniques to dynamically control the duty cycle of accesses to and from data storage devices in data storage systems. The system (e.g., apparatus, circuitry, hardware, etc.) and the method (i.e., process, operation, routine, blocks, steps, etc.) of the present invention may be advantageously implemented in connection with data storage devices such as tape drives, magnetic disk drives, optical disk drives, and the like.

The present invention generally provides for a system and a method to monitor a respective duty cycle of each storage device using a processor (e.g., controller) that controls accesses (e.g., input/output, IO, operations such as read, write, write/read, and the like) the data storage devices at prescribed intervals. When the duty cycle exceeds a predetermined desired range (i.e., exceeds a threshold value, level, or amount), the controller generally dynamically inserts periods (i.e., intervals) of time (i.e., provides for inter IO delay) prior to starting (initiating) a next (or subsequent) device access. The delay is generally selected to provide a minimum duty cycle value. When the duty cycle is at an acceptable value, the delay factor (i.e., amount, interval, value, etc.) may be reduced or eliminated. As such, the duty cycle is maintained within a predetermined acceptable range, and maximum performance and maximum mean time between failure (MTBF) related reliability of the storage devices is generally ensured.

When the data storage system is implemented with a redundant power supply system, that is, a power supply system with two separate power supplies (i.e., a 2N system), the power draw for each power supply during normal operation is one-half of the total system power capability. When the system is configured such that each power supply can provide, for example, a predetermined amount (e.g., about 75%) of the total system power consumption, the total power capability of the two power supplies is about 150% (i.e., about twice the predetermined amount) of the total demand, and thus the two power supplies can generally readily support the normal system load. To maintain system operation without exceeding power supply capability when operating under a single power supply (e.g., when one of the power supplies is removed for service, disabled, and the like), the present invention may provide for "dialing back" drive activity such that the system power draw is 75% (i.e., the predetermined amount) or less of the normal total system power consumption.

The system and method of the present invention may provide for at least one signal to be generated to monitor current output at each of the power supply voltage levels. The IO subsystem of the present invention will generally monitor the current output signals, and when the current output exceeds a predetermined threshold level (i.e., a predetermined amperage), a warning or alert may be generated and presented. When the current output at each of the power supply voltage levels exceeds a second threshold level that is equal to or higher than the first threshold level, the drive activity may be reduced (i.e., delayed, slowed, curbed, etc.) halted (i.e., delayed, stopped, postponed, etc.), that is, the duty cycle of the drive may be altered, until the current output at each of the power supply voltage levels reduces to a third threshold level. The third threshold level is generally between the first and second threshold levels.

The present invention generally provides for the implementation of a lower power rated, smaller, lower cost, and lighter weight power supply subsystem than conventional approaches. Buffers that are included to protect for worst case operation may be eliminated. When a user operates the system at a worst case mode of drive activity, the speed of the system performance may be reduced, however, the system reliability is generally significantly improved when compared to conventional approaches.

Referring to FIG. 1*a*, a flow diagram illustrating a method 100 for dynamically controlling the duty cycle of data storage device accesses in accordance with the present invention is shown. The method (i.e., process, operation, routine, blocks, steps, etc.) 100 may be advantageously implemented in connection with data storage devices such as tape drives, magnetic disk drives, optical disk drives, and the like. The process 100 may be advantageously implemented in connection with a data storage device controller (e.g., controller 200 described in connection with FIG. 2) to monitor and control data storage device power usage.

In one example, the method 100 may implement an algorithm (i.e., routine, steps, method, process, blocks, operation, calculation, etc.) as follows.

```
Pseudo code algorithm
If (IO request from host){
    read supply status
}
If (power supply status is severe level){
    return to idle (power usage will drop quickly as devices
complete current IO)
}
else if (power supply status is warning level){
    if (device delay value not set)
        set up device delay value
    else if device delay has been met{
    }
}
else
    issue IO to device
```

The data storage system device (e.g., drive) where the routine 100 is implemented may be at an idle state (or condition) (step or block 104). When a drive IO is requested, the routine 100 may determine whether a parameter (e.g., factor, variable, signal, condition, etc.) of the data storage system is greater than (i.e., has exceeded) a first predetermined (i.e., selected, given, chosen, etc.) threshold (e.g., level, value, amount, etc.) (decision step or block 106).

In one example, the first predetermined parameter may be power usage by the storage device. However, the first predetermined parameter may be implemented as any appropriate system parameter to meet the design criteria of a particular application.

When the first predetermined parameter is power usage by the storage device, the first predetermined parameter threshold may correspond to a power usage level that is at or above a percentage (e.g., nominally about 95% and having a preferred range of 93% to 98%) of the maximum power output of the total power supply capacity for the data storage system that, when exceeded, may cause the data storage system performance (e.g., data transfer speed) to degrade below a first specified or recommended level (e.g., a predetermined number of Megabits per second).

When the first predetermined parameter threshold is exceeded, the IO activity is halted, and the method 100 generally returns the data storage system to the idle state 104 (i.e., the YES leg of the decision block 106). Returning to the decision block 106, when the first predetermined parameter is not exceeded (i.e., the NO leg of the decision block 106), the routine 100 may determine whether the first parameter of the data storage system is greater than (i.e., has exceeded) a second predetermined threshold (decision step or block 108).

When the first predetermined parameter is power usage by the storage device, the second predetermined parameter threshold may correspond to a power usage level that is at or above another percentage (e.g., nominally about 70% and having a preferred range of 65% to 75%) of the maximum power output of the total power supply capacity for the data storage system that is less than the first predetermined parameter threshold. When the first predetermined parameter exceeds the second predetermined parameter threshold (i.e., the YES leg of the decision block 108), the performance of the data storage system does not generally degrade below the specified or recommended level. However, the data storage system may present (i.e., send, transmit, display, etc.) an alert (or warning) signal (or message) to a user or to another appropriate receiver (such as a monitor routine, not shown, in the drive system), and, when a first IO delay factor (e.g., a preselected time interval) has not been set, the process 100 may set the first IO delay factor (step or block 112).

The process 100 may determine whether the first IO delay factor (i.e., an inter-IO delay factor) has expired (i.e., has been achieved) (step or block 114). When the first IO delay factor has expired (the YES leg of the decision block 114), the process 100 may perform the requested device IO (step or block 110), and the process 100 generally returns to the idle state 104. Returning to the decision block 114, when the first IO delay factor has not expired (the NO leg of the decision block 114), the process 100 generally returns to the idle state 104.

Returning to the decision block 108, when the first predetermined parameter does not exceed the first predetermined parameter threshold and does not exceed the second predetermined parameter threshold (the NO leg of the decision block 108), the process 100 generally performs the requested device IO operation (i.e., the block 110), and returns to the idle state 104.

When the first predetermined parameter is power usage by the storage device, the process 100 may stay at the idle state 100 when the power usage level that is at or above a third predetermined percentage (e.g., nominally about 90% and having a preferred range of 85% to 92%) of the maximum power output of the total power supply capacity for the data storage system. That is, the method 100 may further provide hysteresis (or a safety factor) to the idle condition 104.

The values for the predetermined parameters and the respective thresholds are exemplary only. The values for the predetermined parameters are generally selected to meet the design criteria of a particular application. In one example, the method 100 may be advantageously implemented in connection with a data storage system having a 2N redundant power supply.

Figure 1B:
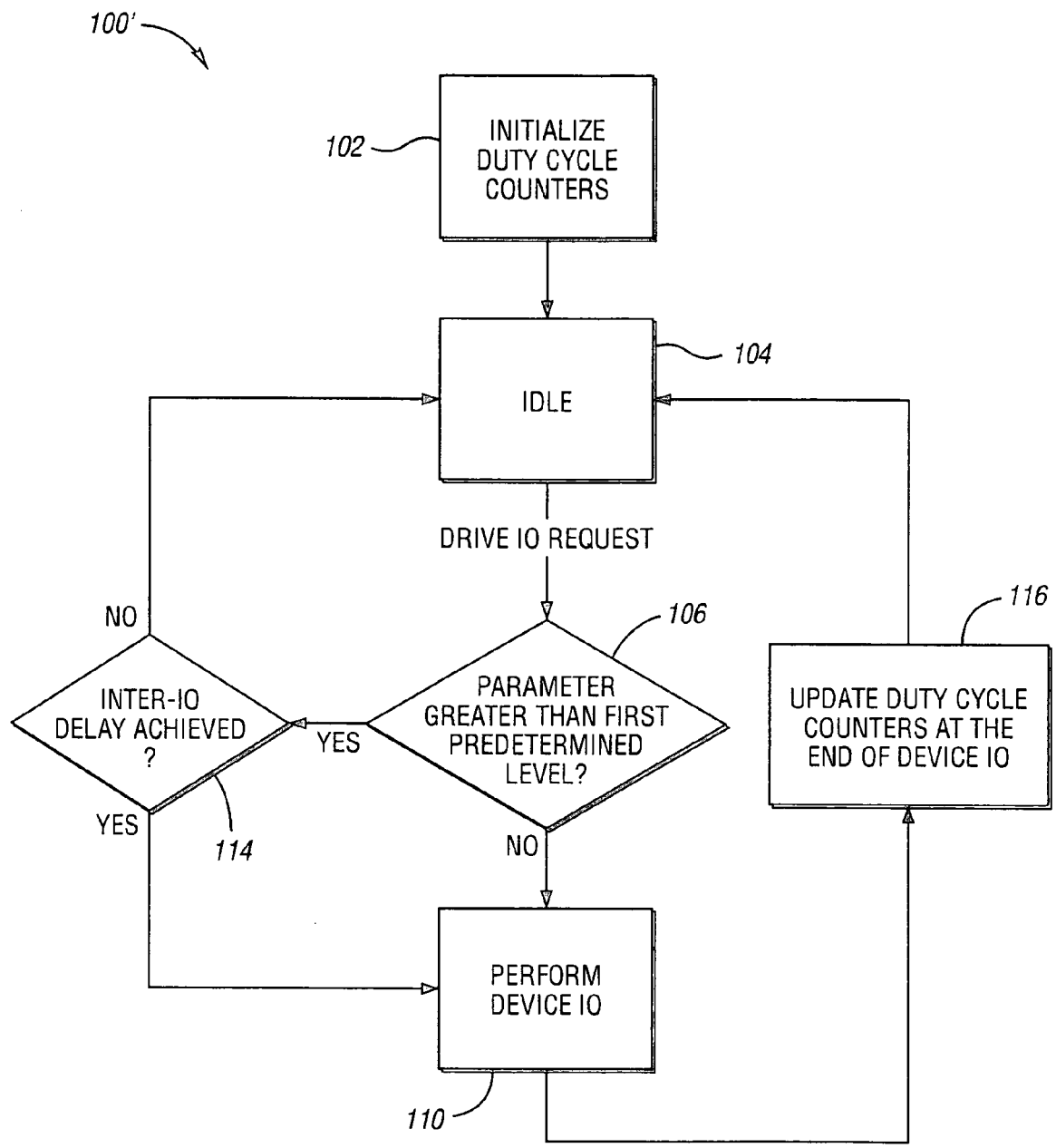

Referring to FIG. 1*b*, a flow diagram of an alternative method 100' of dynamically controlling the duty cycle of accesses to and from data storage devices according to the present invention of the present invention is shown. The process 100' is generally implemented in connection with a data storage device controller (e.g., the controller 200 described in connection with FIG. 2) to monitor and control data storage system device duty cycles.

The data storage system device (e.g., drive) where the routine 100' is implemented may initialize at least one duty cycle counter (step or block 102). The data storage system device (e.g., drive) where the routine 100' is implemented may be at an idle state (or condition) (step or block 104). When a drive IO is requested, the routine 100' may determine whether a parameter (e.g., factor, variable, signal, condition, etc.) of the data storage system is greater than (i.e., has exceeded) a first predetermined (i.e., selected, given, chosen, etc.) threshold (e.g., level, value, amount, etc.) (decision step or block 106).

In one example, the first predetermined parameter may be duty cycle of accesses to and from the storage device. However, the first predetermined parameter may be implemented as any appropriate system parameter to meet the design criteria of a particular application.

When the first predetermined parameter is duty cycle of accesses to and from the storage device, the first predetermined parameter threshold may correspond to a duty cycle level that is at or above a percentage (e.g., nominally less than 50%, and having a preferred range of less than 60% and a most preferred range of less than 55%) of the maximum duty cycle for the data storage system that, when exceeded, may cause the data storage system performance (e.g., MTBF) to degrade below a specified or recommended level (e.g., 500,000 hours).

When the first predetermined parameter threshold is exceeded (i.e., the YES leg of the decision block 106), the IO activity is halted, and the method 100' generally determines whether the first IO delay factor has expired (i.e., has been achieved) (step or block 114). The first predetermined IO delay factor is generally selected (or chosen) to provide (or ensure) a data storage system duty cycle that will meet or exceed the predetermined reliability specifications.

When the first IO delay factor has expired (the YES leg of the decision block 114), the process 100' may perform the requested device IO (step or block 110), and the process 100' generally updates the at least one duty cycle 10 counter when the requested device IO operation has been performed (step or block 116), and returns to the idle state 104.

Returning to the decision block 114, when the first IO delay factor has not expired (the NO leg of the decision block 114), the process 100' generally returns to the idle state 104. Returning to the decision block 106, when the first predetermined parameter is not exceeded (i.e., the NO leg of the decision block 106), the routine 100' may perform the requested device IO (i.e., the block 110), and the process 100' generally updates the at least one duty cycle IO counter when the requested device IO operation has been performed (i.e., the block 116), and returns to the idle state 104.

Referring to FIG. 2, a diagram of a data storage system power system 200 of the present invention is shown. In one example (i.e., a 2N power supply example), the system 200 comprises a storage device array 210, a pair of power supplies 212(*a-b*), at least one data storage device IO controller 214 (e.g., controllers 214*a*-214*n*), and an output current monitor 216. The methods 100 and 100' may be advantageously implemented in connection with the system 200. However, the methods 100 and 100' may be implemented in connection with any appropriate apparatus or circuitry to meet the design criteria of a particular application.

The array 210 comprises at least one and generally a plurality of data storage drives 220 (e.g., drives 220*a*-220*n*). The data storage devices 220 may be implemented as tape drives, magnetic disk drives, optical disk drives, and the like. The data storage devices 220 may present different voltage, current, and power loads to the power source (e.g., 2N power supplies) that provides electrical energy within the system 200. The array 210 may have one or more inputs that receive electrical current (e.g., PWRCUR) from the power supplies 212.

The current PWRCUR generally provides electrical energy to the drives 220. The array 210 may have at least one input that receives a respective control signal (e.g., REQa-REQn) from a controller 214. The control signals REQ are generally IO requests (commands). The array 210 generally performs IO operations (e.g., read, write, and the like) in response to the appropriate control signal REQ.

The power supplies 212*a* and 212*b* may have an output that provides a respective current, and the sum of the currents from the power supplies 212*a* and 212*b* comprises the total current PWRCUR. The monitor 216 generally determines the amount (i.e., value, level, amperage, etc.) (e.g., a signal IOCURR) of the total current PWRCUR by monitoring the output current (i.e., the current that is presented to the array 210) of each power supply 212. The voltage of the output of the power supplies 212 is at a substantially fixed level. As such, the output power of the power supplies 212 (i.e., the power consumed by the array 210) is directly related (i.e., corresponds to) the output current of the power supplies 212.

The controller 214 generally comprises a first comparator 230, a current threshold generator 232, a second comparator 234, an IO bus 236, a counter/timer (C/T) 238, and a delay (i.e., "dial back") circuit 240. The controller 214 may have an input that receives a respective IO request (i.e., a control signal, command, etc., REQ) and a respective output that may present the IO request REQ. That is, the controller 214*a* generally receives and presents the IO control signal REQa, the controller 214*b* generally receives and presents the IO control signal REQb, and so forth. The controllers 214 each may have an input that receives the signal IOCURR, an input that receives a control signal (e.g., UPDT), and an output that presents an alert signal (e.g., WARN).

The signal UPDT may be a control signal that may update (e.g., set or reset) a counter/timer such as the C/T 238. The signal WARN may be an alert that is presented when an IO request delay is not desired, however, precautions may be initiated by the receiver of the signal WARN, as appropriate.

The comparator 230 may have a first input that receives the signal IOCURR, a second input that receives a signal (e.g., THRESH_1), and an output that presents a signal (e.g., DEL). The signal THRESH_1 may correspond to a current amperage value that represents the first predetermined threshold level. The signal DEL may be a control signal that is presented when an IO request delay is desired. The comparator 230 may compare the amperage of the total current (e.g., the signal IOCURR) with the first predetermined threshold level (e.g., the signal THRESH_1), and present the signal DEL when the signal IOCURR exceeds (i.e., is greater than) the signal THRESH_1.

The generator 232 may present the signal THRESH_1 and a signal (e.g., THRESH_2). The signal THRESH_2 may correspond to a current amperage value that represents the second predetermined threshold level. The comparator 234 may have a first input that receives the signal IOCURR, a second input that receives the signal THRESH_2, and an output that presents a signal (e.g., WARN). The comparator 234 may compare the amperage of the total current (e.g., the signal IOCURR) with the second predetermined threshold level (e.g., the signal THRESH_2), and present the signal WARN when the signal IOCURR exceeds (i.e., is greater than) the signal THRESH_2.

The comparator 230 generally presents the signal DEL to an input of the delay circuit 240. The delay circuit 240 may have an output that is coupled (i.e., connected, interfaced, etc.) to the bus 236. The bus 236 generally has an input that receives the command REQ and presents the command REQ to the array 210. The bus 236 may be configured to delay (or hold) the presentation of the command REQ by a predetermined time interval in response to the output of the delay circuit 240. The delay circuit 240 generally initiates the delay of the presentation of the request REQ in response to the signal DEL.

The C/T 238 may have an input the receives the command REQ, an input that receives the signal UPDT, and an output that is coupled to the IO bus 236. The C/T 238 may be configured to determine a duty cycle of the IO requests to the data storage array 210. The C/T 238 may be used to determine whether the first IO delay factor (e.g., an inter-IO delay) has expired (been achieved). When the first IO delay factor has not yet expired, the C/T 238 may delay (or hold) the presentation of the request REQ from the bus 236.

As is readily apparent from the foregoing description, then, the present invention generally provides an improved method (e.g., the processes 100 and 100') and an improved system (e.g., the system 200) for dynamically controlling the duty cycle of storage device accesses. The improved method and system of the present invention may be advantageously implemented to provide improved data storage system reliability, and lower cost and weight, and smaller size, especially of the data storage system power supply subsystem, than conventional approaches.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. For use in a data storage system, a method of dynamically controlling storage device power supply current, the method comprising:
    monitoring at least one parameter related to power usage of the data storage system wherein the at least one parameter related to power usage comprises total current consumed by the data storage system;
    receiving an IO request when the data storage system is at an idle state;
    determining when power usage by the data storage system is greater than a first predetermined level;
    returning to the idle state when the power usage by the data storage system is greater than the first predetermined level;
    determining when the power usage by the data storage system is greater than a second predetermined level when the power usage by the data storage system is equal to or less than the first predetermined level;
    setting a delay factor when the delay is not set, and determining whether an inter-IO delay has expired when the power usage by the data storage system is greater than the second predetermined level;
    returning to the idle state when the inter-IO delay has not expired; and
    performing a respective IO operation in response to the IO request and returning to the idle state when the inter-IO delay has expired, and when the power usage by the data storage system is equal to or less than the second predetermined level.

2. The method according to claim 1 further comprising presenting an alert signal when the power usage by the data storage system is greater than the second predetermined level.

3. The method according to claim 1, wherein the first predetermined level is nominally about 95% and having a preferred range of 93% to 98% of the power usage by the data storage system.

4. The method according to claim 1, wherein the second predetermined level is nominally about 70% and having a preferred range of 65% to 75% of the power usage by the data storage system.

5. The method according to claim 1 further comprising holding the IO request at the idle state when the power usage by the data storage system is greater than a third predetermined level.

6. The method according to claim 5, wherein the third predetermined level is less than the first predetermined level and greater than the second predetermined level.

7. The method according to claim 5, wherein the third predetermined level is nominally about 90% and having a preferred range of 85% to 92% of the power usage by the data storage system.

8. A data storage system having a dynamically controlled storage device power supply current, the system comprising:
    a storage device array including at least one data storage device; and
    a controller including:
        an input/output (IO) bus configured to present at least one IO request that relates to a respective access to and from the at least one storage device; and
        at least one IO controller configured to:
            monitor at least one parameter related to power usage of the data storage system wherein the at least one parameter related to power usage comprises total current consumed by the storage device array;
            receive IO requests when the data storage system is at an idle state;
            determine when power usage by the array is greater than a first predetermined level;
            return to the idle state when the power usage by the array is greater than the first predetermined level;
            determine when the power usage by the array is greater than a second predetermined level when the power usage by the array is equal to or less than the first predetermined level;
            set a delay factor when the delay is not set, and determine whether an inter-IO delay has expired when the power usage by the array is greater than the second predetermined level;
            return to the idle state when the inter-IO delay has not expired; and
            perform a respective IO operation in response to the IO request and return to the idle state when the inter-IO delay has expired, and when the power usage by the array is equal to or less than the second predetermined level.

9. The system according to claim 8 wherein the IO controller is further configured to present an alert signal when the power usage by the array is greater than the second predetermined level.

10. The system according to claim 9, wherein the first predetermined level is nominally about 95% and having a preferred range of 93% to 98% of the power usage by the array.

11. The system according to claim 10, wherein the second predetermined level is nominally about 70% and having a preferred range of 65% to 75% of the power usage by the array.

12. The system according to claim 9 wherein the IO controller is further configured to hold the IO request at the idle state when the power usage by the array is greater than a third predetermined level.

13. The system according to claim 12, wherein the third predetermined level is less than the first predetermined level and greater than the second predetermined level.

14. The system according to claim 13, wherein the third predetermined level is nominally about 90% and having a preferred range of 85% to 92% of the power usage by the array.

15. A controller for dynamically controlling power supply current to at least one storage device in a data storage system array, the controller comprising:

an input/output (IO) bus configured to present at least one IO request that relates to a respective access to and from the at least one storage device; and at least one IO controller configured to:
monitor at least one parameter related to power usage of the array wherein the at least one parameter related to power usage comprises total current consumed by the array;
receive IO requests when the array is at an idle state;
determine when power usage by the array is greater than a first predetermined level;
return to the idle state when the power usage by the array is greater than the first predetermined level;
determine when the power usage by the array is greater than a second predetermined level when the power usage by the array is equal to or less than the first predetermined level;
present an alert signal, set a delay factor when the delay is not set, and determine whether an inter-IO delay has expired when the power usage by the array is greater than the second predetermined level;
return to the idle state when the inter-IO delay has not expired; and
perform a respective IO operation in response to the IO request and return to the idle state when the inter-IO delay has expired, and when the power usage by the array is equal to or less than the second predetermined level.

16. The controller according to claim 15 wherein two power supplies are each configured to provide a respective electrical current to the array, a total electrical current is the sum of the two respective electrical currents, and the total electrical current is related to the power usage.

17. The controller according to claim 15, wherein the first predetermined level is nominally about 95% and having a preferred range of 93% to 98% of the power usage by the array, and the second predetermined level is nominally about 70% and having a preferred range of 65% to 75% of the power usage by the array.

18. The controller according to claim 15 wherein the IO controller is further configured to hold the IO request at the idle state when the power usage by the array is greater than a third predetermined level, the third predetermined level is less than the first predetermined level and greater than the second predetermined level, and the third predetermined level is nominally about 90% and having a preferred range of 85% to 92% of the power usage by the array.

* * * * *